S. H. HALL.
DRIVE FOR MACHINERY.
APPLICATION FILED DEC. 21, 1912.
1,186,982.
Patented June 13, 1916.
2 SHEETS—SHEET 1.
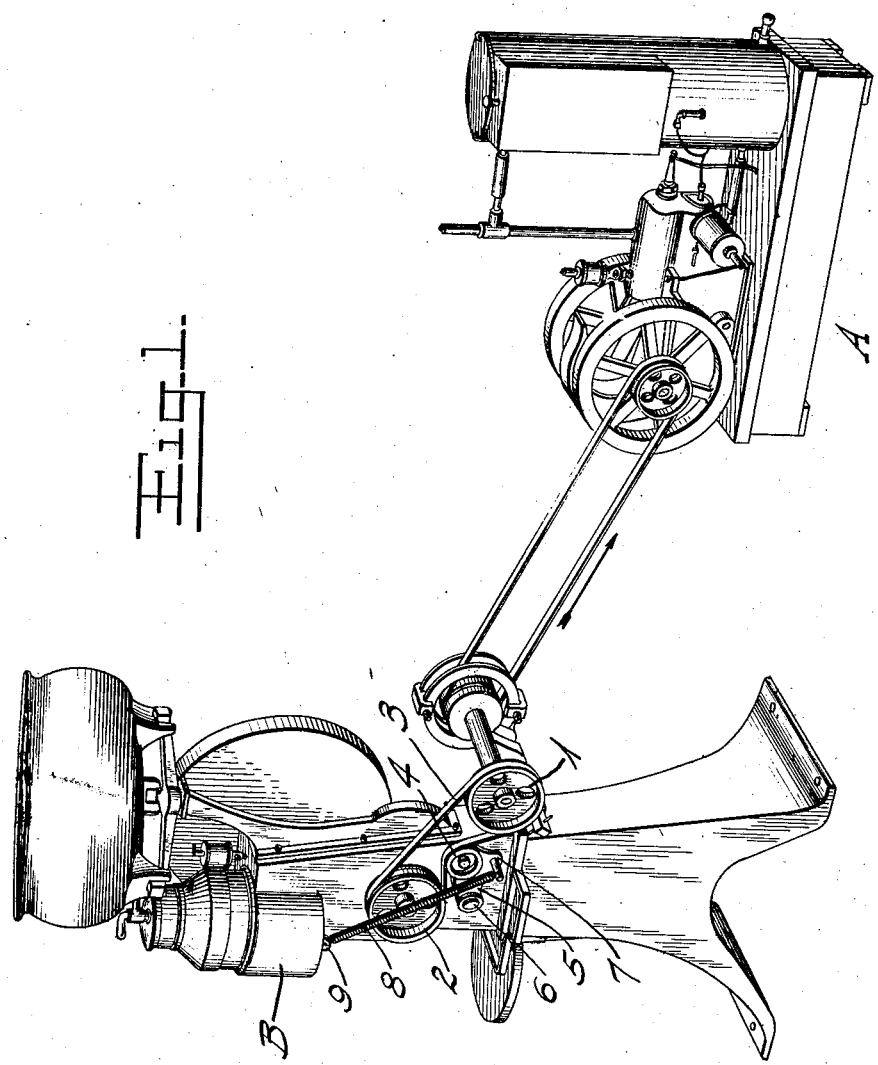
S. H. Hall  Inventor
By his Attorneys
Bartlett & Brownell S. H. HALL.
DRIVE FOR MACHINERY.
APPLICATION FILED DEC. 21, 1912.
1,186,982.
Patented June 13, 1916.
2 SHEETS—SHEET 2.
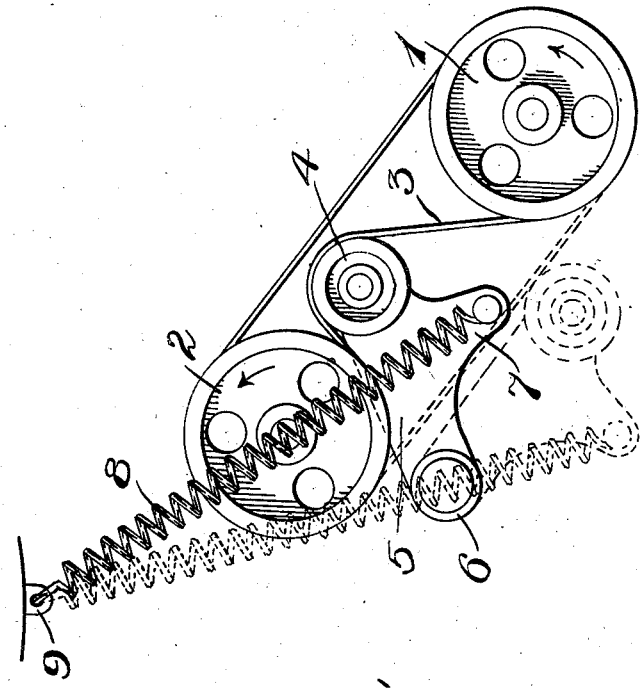
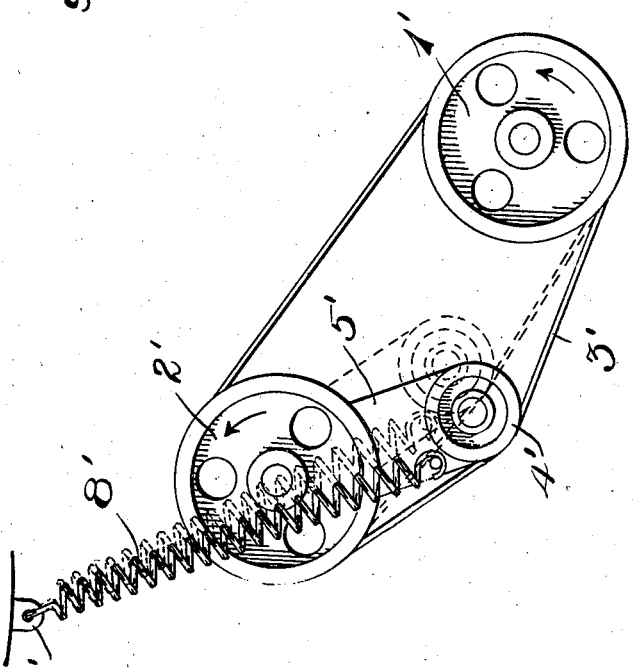

UNITED STATES PATENT OFFICE.

SELDEN H. HALL, OF POUGHKEEPSIE, NEW YORK, ASSIGNOR TO THE DE LAVAL SEPARATOR COMPANY, OF NEW YORK, N. Y., A CORPORATION OF NEW JERSEY.

DRIVE FOR MACHINERY.

1,186,982.

Specification of Letters Patent. Patented June 13, 1916.

Application filed December 21, 1912. Serial No. 737,982.

*To all whom it may concern:*

Be it known that I, SELDEN H. HALL, a citizen of the United States, residing at Poughkeepsie, Dutchess county, State of New York, have invented certain new and useful Improvements in Drives for Machinery, of which the following is a full, clear, and exact description.

My invention relates to improvements in drives for machinery and has for its object to produce a drive which will automatically prevent such shocks for machines, for instance, cream separators, liable to be injured by sudden harmful shocks such as those from a gas engine having a light fly wheel.

In carrying out my invention, I make use of a yielding idler acting upon an otherwise loose driving belt. Idlers acting upon driving belts have heretofore been used so as to make contact with the slack side of the belt. With the idler in this position, if a sudden increase occurs in the speed of the pulley driving the belt, the working part of the belt will become more taut and the slack side will become longer. This will allow the idler to move inward and increase the length of contact with the pulleys and make it more difficult for the belt to slip. Inasmuch as with such an arrangement the driving side of the belt does not give to any considerable extent, and the slipping on the pulleys, if anything, lessened, the sudden increase of the speed of driving pulley imparts a shock to the machinery. Idlers have also been used on the tight side of belts, but not in such a manner as to automatically produce a substantially uniform belt tension.

In carrying out my invention, I place a yielding idler so that it contacts with the tight or working side of the belt. When in this position, a sudden increase in speed of the driving pulley will force the idler to yield so as to loosen the belt and prevent a sudden corresponding increase in belt tension, thereby lessening the shock due to the resulting strain upon the tight side of the belt. When the idler contacts with the outer surface of the tight side of the belt an increase in speed not only causes the idler to move so as to result in reducing the shock transmitted through the tight side, but also, on account of the straightening out of the tight side, decreases the surfaces over which the belt makes contact with the pulleys. At the same time, the slack side having become more slack will further decrease the arcs of contact, such decreases permitting the belt to slip more easily and to relieve the driven machine to a greater degree from shocks due to irregular speed of the driving pulley than was the case in connection with idlers making contact with the slack side. In carrying out my invention I preferably also mount the idler on a lever so disposed that as the belt straightens, the effective lever arm on which the belt acts increases. If a spring or the like is used to keep the idler in contact with the belt, I preferably so connect it that the lever arm on which it acts decreases as the belt straightens.

The following is a description of an embodiment of my invention, reference being had to the accompanying drawings, in which, Figure 1 shows a perspective view of an embodiment of my invention. Fig. 2 shows in side elevation an enlarged detail of the preferred embodiment of my drive; and, Fig. 3 shows in side elevation a modification of the same.

Referring more particularly to the drawings, 1 is a driving pulley which may be considered to be directly connected to a prime mover such as a gas engine A. 2 is the driven pulley of a machine such as a cream separator B. 3 is a belt running upon said pulleys so that power is transmitted through it from the pulley 1 to the pulley 2. The direction of rotation of pulleys 1 and 2 is counterclockwise, as shown by the arrows.

4 is an idler carried by a frame 5, pivotally mounted on a bearing 6. This bearing is so located that if the belt 3 were straight on both sides, it would be without the area bounded by the belt. The arm 5 is provided with a projection 7, to which is connected one end of a spring 8, the other end of said spring being connected to an anchorage 9. The projection 7 is preferably located a little nearer the axis on the idler 4 than it is to the axis of the bearing 6 and, with the parts in the positions shown in full lines, is on the opposite side of the arm 5 from the anchorage 9. With this arrangement, a tightening of the belt causes the idler to move so as to tend to bring the end of the projection 7 to that side of the journal 6 which is opposite the anchorage 9; that is, to move the frame 5 to a point where the action of the spring 8 will be on a dead center. The parts are so proportioned that if the belt 3 were straight on both sides, this dead center condition would be produced as shown in dots. It is obvious, however, that in practice the belt would never be so tight as to be straight.

In the form shown in Fig. 1, a sudden increase in the speed of the pulley 1 causes the lower or tight side of the belt 3 to straighten, moving the idler 4 downward, thus relieving somewhat the shock due to the sudden increase in speed, and also permitting the loose side of the belt to become still more loose, so that it is more likely to slip upon the pulleys 1 and 2. Again, when the belt stretches, the idler will move to take it up. Since such movement will result in an increase in the effective lever arm on which the spring 8 acts, and a decrease in the effective lever arm on which the belt 3 acts through the idler to oppose the spring, with the result that when a proper constant spring is used, there will be a nearly uniform tension in the working side of the belt throughout substantially the whole possible range of variations in the length of the working side. When the working side is substantially straight the lever arm on which the spring works is substantially zero, so that the idler exerts but little force upon the belt while during the straightening of the belt the lever arm on which the belt acts has been steadily increasing.

In the modification shown in Fig. 2, the arm 5' carrying the idler 4' is mounted so as to move about the axis of the driven pulley 2', the spring 8' being connected to the anchorage 9' in such a manner that, if the belt were straight, the effective lever would be substantially on a dead center. With this arrangement, the idler 4' makes contact with the inside of the tight side of the belt as shown, and when the driving speed increases suddenly, is moved upward by the straightening of the tight side of the belt. During such straightening of the belt the lever arm on which the belt acts has been increasing and the lever arm on which the spring acts has been decreasing. This straightening loosens the belt, relieves the initial shock and accomplishes some of the advantages of my invention in its preferred form.

As will be evident to those skilled in the art, my invention permits of various other modifications without departing from the spirit thereof or the scope of the appended claims.

What I claim is:

1. In an automatic belt-tension regulating machinery drive, the combination of a driving pulley, a driven pulley, a belt loosely connecting said pulleys, a movably mounted idler adapted to make contact with the tight side only of the belt, a frame carrying said idler, a spring adapted to move said frame so as to maintain said idler in yielding engagement with said tight side and automatically permit said belt to loosen and upon sudden increase in the speed of the driving pulley so as to slip, a driven apparatus and a prime mover so related to the driven apparatus as to make slipping of the belt desirable upon sudden increase in speed of the prime mover.

2. In an automatic belt-tension regulating machinery drive, the combination of a driving pulley, a driven pulley, a belt loosely connecting said pulleys, a movably mounted idler adapted to make contact with the tight side only of the belt, a frame carrying said idler, a spring adapted to move said frame so as to maintain said idler in yielding engagement with said tight side and automatically permit said belt to loosen upon sudden increase in the speed of the driving pulley so as to slip, and a shock producing prime mover.

3. In an automatic belt-tension regulating machinery drive, the combination of a driving pulley, a driven pulley, a belt loosely connecting said pulleys, a movably mounted idler adapted to make contact with the tight side only of the belt, a frame carrying said idler, a spring adapted to move said frame so as to maintain said idler in yielding engagement with said tight side and automatically permit said belt to loosen upon sudden increase in the speed of the driving pulley so as to slip, a shock producing prime mover, and a driven apparatus which should not be subjected to sudden shocks.

4. In an automatic belt-tension regulating machinery drive, the combination of a driven pulley, a driving pulley, a belt connecting said pulleys, a movably mounted idler engaging the tight side only of said belt, a pivoted lever carrying said idler and free to automatically yield to permit said tight side to straighten, the fulcrum of said lever being so located that as the tight side of the belt straightens the effective lever arm of the lever carrying the idler on which the belt acts increases.

5. In an automatic belt-tension regulating machinery drive, the combination of a driven pulley, a driving pulley, a belt connecting said pulleys, a movably mounted idler engaging the tight side only of said belt, a pivoted lever carrying said idler, the fulcrum of said lever being so located that as the tight side of the belt straightens the effective lever arm of the lever carrying the idler on which the belt acts increases, and means acting on said lever for holding said idler in automatically yielding engagement with said belt.

6. In an automatic belt-tension regulating machinery drive, the combination of a driven pulley, a driving pulley, a belt connecting said pulleys, a movably mounted idler engaging the tight side only of said belt, a pivoted lever carrying said idler, the fulcrum of said lever being so located that as the tight side of the belt straightens the effective lever arm of the lever carrying the idler on which the belt acts increases, and means acting on said lever for holding said idler in automatically yielding engagement with said belt, the effective lever arm on which said means acts decreasing as the effective lever arm on which the belt acts increases.

7. In an automatic belt-tension regulating machinery drive, the combination of a driven pulley, a driving pulley, a belt connecting said pulleys, a movably mounted idler engaging the tight side only of said belt, a pivoted lever carrying said idler, the fulcrum of said lever being so located that as the tight side of the belt straightens the effective lever arm of the lever carrying the idler on which the belt acts increases, and a spring acting on said lever for holding said idler in automatically yielding engagement with said belt.

8. In an automatic belt-tension regulating machinery drive, the combination of a driven pulley, a driving pulley, a belt connecting said pulleys, a movably mounted idler engaging the tight side only of said belt, a pivoted lever carrying said idler, the fulcrum of said lever being so located that as the tight side of the belt straightens the effective lever arm of the lever carrying the idler on which the belt acts increases, and a spring acting on said lever for holding said idler in automatically yielding engagement with said belt, the effective lever arm on which said spring acts decreasing as the effective lever arm on which the belt acts increases.

9. In an automatic belt-tension regulating machinery drive, the combination of a driven pulley, a driving pulley, a belt connecting said pulleys, a movably mounted idler engaging the outer surface of the tight side only of said belt, a pivoted lever carrying said idler, the fulcrum of said lever being so located that as the tight side of the belt straightens the effective lever arm of the lever carrying the idler on which the belt acts increases, and means acting on said lever for holding said idler in automatically yielding engagement with said belt.

10. In an automatic belt-tension regulating machinery drive, the combination of a driven pulley, a driving pulley, a belt connecting said pulleys, a movably mounted idler engaging the outer surface of the tight side only of said belt, a pivoted lever carrying said idler, the fulcrum of said lever being so located that as the tight side of the belt straightens the effective lever arm of the lever carrying the idler on which the belt acts increases, and a spring acting on said lever for holding said idler in automatically yielding engagement with said belt, the effective lever arm on which said spring acts decreasing as the effective lever arm on which the belt acts increases.

11. In an automatic belt-tension regulating machinery drive, the combination of a driven pulley, a driving pulley, a belt connecting said pulleys, a movably mounted idler engaging the tight side only of said belt, a pivoted lever carrying said idler, the fulcrum of said lever being so located that as the tight side of the belt straightens the effective lever arm of the lever carrying the idler on which the belt acts increases, and means acting on said lever for holding said idler in automatically yielding engagement with said belt, the effective lever arm on which said means acts decreasing as the effective lever arm on which the belt acts increases, the fulcrum of said lever being outside the area that would be bounded by said belt if both sides were substantially straight and on the same side of said surface as said idler.

12. In an automatic belt-tension regulating machinery drive, the combination of a driven pulley, a driving pulley, a belt connecting said pulleys, a movably mounted idler engaging the tight side only of said belt, a pivoted lever carrying said idler, the fulcrum of said lever being so located that as the tight side of the belt straightens the effective lever arm of the lever carrying the idler on which the belt acts increases, and means acting on said lever for holding said idler in automatically yielding engagement with said belt, said means acting substantially on a dead center when said tight side is straight.

13. In combination, a cream separator, a driving source therefor, a flexible connection between said separator and driving source, and means engaging the taut side of said flexible connection for absorbing impulses transmitted from said driving source.

14. In combination, a separator, pulsating driving means, a belt connecting said separator and said driving means, and a spring pressed pulley engaging the taut side of said belt to absorb impulses transmitted from said driving means, the general directions of the belt on different sides of the point of contact of said belt and pulley being at an angle with respect to each other.

15. In an automatic belt-tension regulating machinery drive, the combination of a driving pulley, a driven pulley, a belt loosely connecting said pulleys, a movably mounted idler adapted to make contact with the tight side only of the belt, a pivoted frame carrying said idler, a spring adapted to move said frame so as to maintain said idler in yielding engagement with said tight side and automatically permit said belt to loosen upon sudden increase in the speed of the driving pulley so as to slip, said spring being so located that the effective length of the lever on which the spring acts shortens as the side of the belt on which the idler bears straightens, a driven apparatus and a prime mover so related to the driven apparatus as to make slipping of the belt desirable upon sudden increase in speed of the prime mover.

16. The combination of a driving pulley, a driven pulley, a belt loosely connecting said pulleys, a movably mounted idler adapted to make contact with the tight side only of the belt, a frame carrying said idler, a spring adapted to move said frame so as to maintain said idler in yielding engagement with said tight side and automatically permit said belt to loosen upon sudden increase in the speed of the driving pulley so as to slip, a pulsating gas engine and a separator, said gas engine driving said separator through said pulleys and belt.

SELDEN H. HALL.

Witnesses:
JOSEPH J. MAHER,
HARRY C. BADSLIN.